June 27, 1967 G. G. BARRLING 3,328,644
DEVICE FOR COOLING RECTIFIERS
Filed Oct. 27, 1965
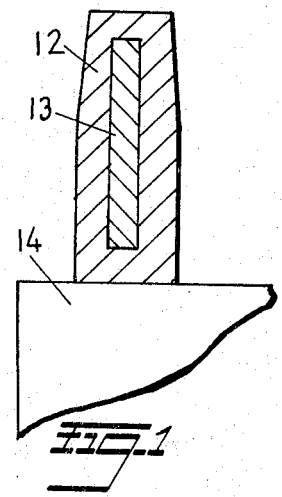
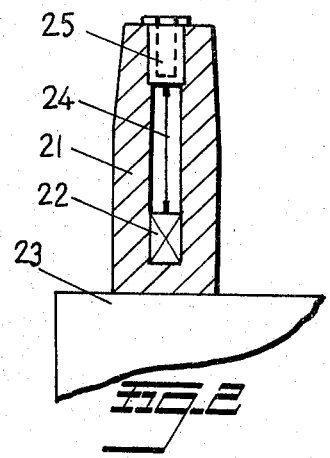
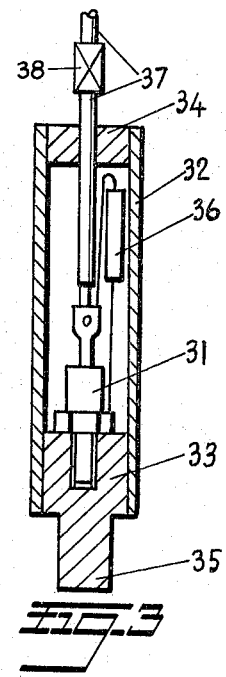
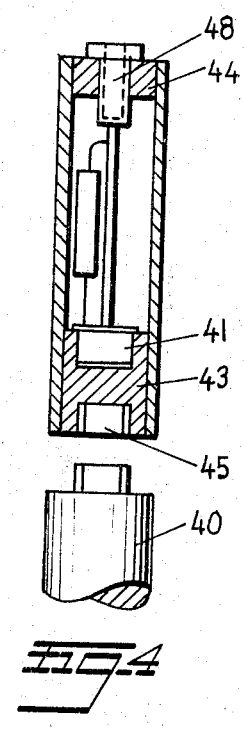
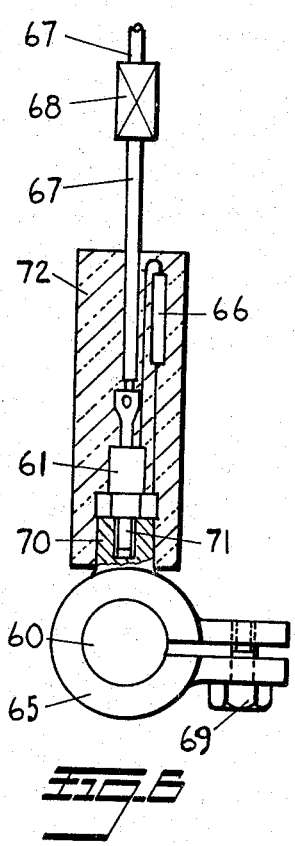
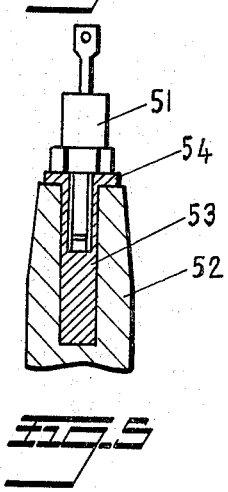
INVENTOR.
GÖSTA GUNNAR BARRLING
BY
Strauch, Nolan, Neale,
Nies & Bronaugh
ATTORNEYS United States Patent Office 3,328,644
Patented June 27, 1967

3,328,644
DEVICE FOR COOLING RECTIFIERS
Gösta Gunnar Barrling, Wivalliusgatan 21,
Stockholm, Sweden
Filed Oct. 27, 1965, Ser. No. 505,391
Claims priority, application Sweden, Oct. 29, 1964,
13,011/64
10 Claims. (Cl. 317—100)

This invention relates to new and useful methods and means for cooling rectifiers, used for charging electric accumulator batteries, containing an easily flowing electrolyte. More specifically, the invention relates to such rectifiers of the semi-conductor type which heretofore were dependent on special means for cooling, e.g. cooling fins.

According to the invention, the need for such special means will be eliminated, partly or completely, by providing means for transmitting the heat from the rectifier to the battery. From the battery the heat will be transmitted to the ambient air by radiation and by conduction.

The operation of a device according to the present invention is partly based on the fact that an easily flowing electrolyte has a good heat transmitting power within a battery cell during charging thereof due to the motion of the electrolyte, and partly on the fact that electric accumulator batteries generally have a large heat capacity as compared to the quantity of heat developed in the rectifier. Moreover, an accumulator battery generally has a large outer surface from which the heat is radiated and conducted to the ambient air at a temperature level insignificantly above the level caused by the heat developed in the battery during the charging. The heat may be conducted to the accumulator in different ways. A heat conducting path may, for instance, be obtained by providing a good thermal contact between the rectifier or rectifiers and one or more of the terminal poles of the battery or by arranging the rectifier element, which may also be provided with a cooling flange or the like, in direct thermal contact with the electrolyte and/or one of the electrodes of the battery. In this case a sufficient isolation with regard to electrical contact and chemical attack should be provided. In case of battery containers of metal, heat from the rectifier may be supplied to the container without first passing a terminal pole or an electrode.

When heat is transmitted to the battery by bringing the rectifier in thermal contact with a terminal pole (for example by means of one or more intermediate connecting members with low or negligible heat resistance) the heat is conducted through said pole to the electrodes associated therewith and therefrom to the electrolyte. Then the electrolyte conducts the heat throughout the battery cell and transmits it to the walls of the container through which the heat is transmitted to the ambient air. In batteries with more than one cell, more or less heat is conducted to the next cell, depending on the construction, partly by conduction and convection in or at the cell walls and partly by conduction of heat the same ways as the electric current flows, i.e. through the terminal pole, the connecting means and next terminal pole.

In batteries with several cells, a better cooling effect and heat accumulating power may be obtained—provided that the rectifier circuit has a plurality of rectifier elements and is suited therefore—if the heat from the rectifier elements is more evenly distributed over the cells of the battery. A rectifier circuit in the form of a bridge may, for example, be arranged in that way, that two of its elements are electrically and thermally connected to the plus terminal pin and two other elements similarly connected to the minus terminal pin.

As will be easily understood by those skilled in the art, the rise in temperature of the battery due to heat transmitted from the rectifier is without influence on the good function and life of the battery. When heat from the rectifier is transmitted to the battery by an arrangement in accordance with the invention, e.g. to the end of a terminal pin for electric connection, certain temperature gradients will prevail in the battery, of which the most important, and the only one of practical importance for the cooling of the rectifier is that one which occurs in the terminal pin, since said pin generally is made of a material having a relatively poor heat conductivity, such as lead or iron. It has been found that in most cases this temperature gradient is fully acceptable. It may, however, be reduced by providing the terminal with a core of a material having a better heat conductivity, such as copper or aluminium. The temperature gradient of the terminal may further be reduced by arranging an element such as a silicium diode of small dimensions within the terminal at a short distance from the electrolyte. The alternating current to the rectifier element may in such a case be supplied at the central part of the terminal. In this embodiment a coaxial connection means may be provided, whereby the alternating current is supplied to the central contact and the direct current is taken out from the battery through the peripheral contact.

It will be easily understood, that the heat capacity of the accumulator in combination with the good heat transmitting power of the electrolyte permits that the charging current may be higher than normal for a relatively long time without harming the battery by the temperature rise due to heat transmitted from the rectifier.

In the following the invention will be described more in detail with reference to the accompanying drawing, in which FIG. 1 shows a terminal pin provided with a core of a material having a higher heat conductivity value than the material of the rest of the terminal pin.

FIG. 2 shows an element arranged within a terminal pin.

FIG. 3 shows an easy-to-handle unit provided with a rectifier element.

FIG. 4 is a modification of the unit shown in FIG. 3.

FIG. 5 shows a rectifier element mounted directly on the terminal of a storage battery.

FIG. 6 is another modification of the unit shown in FIG. 3.

In FIG. 1 the terminal pin of a battery is designated 12, 13 is a core in said terminal pin and 14 is one of the electrode plates of the battery.

In FIG. 2 there are shown a terminal 21, a rectifier element 22, a battery electrode plate 23, and connection means 25 which is isolated from the terminal. An electrical connection 24 is provided between the rectifier element 22 and the connection means 25.

The device according to FIG. 3 is easy to handle and constitutes a complete and compact unit which easily may be connected to the terminal of an accumulator battery. In operation, the alternating current is supplied through the conductor 37 and the rectified current as well as the heat developed in the rectifier are drawn from the pin 35, for instance by means of an ordinary clamping means for accumulators clamped to the terminal and fastened to the pin 35 by clamping, by screwing, by soldering or welding. A rectifier 31 is mounted in such a way that the best possible thermal and electrical contact is obtained with the intermediate connection member 33 of which the pin 35 forms a part. The end plate 34 with a hole for the conductor 37 and the intermediate connection member 33 are hermetically mounted in a casing 32. A capacitor 36 is connected in parallel to the rectifier 31 to protect the same against voltage transients. Since the conductor 37 hermetically seals the opening in the end plate 34 the rectifier 31 and the capacitor 36 are completely encased and protected against chemical and mechanical damage. A fuse holder 38 with a fuse is connected in series with the conductor 37. As a modification, the pin 35 may be threaded and screwed directly into the terminal which then has to be provided with a corresponding thread.

In the modification according to FIG. 4 the intermediate connection member is provided with an opening 45 instead of the pin 35. Said opening may be threaded on to the terminal 40 which in this case must be provided with a threaded projection. Instead of a conductor passing through the end plate 44 the modification according to FIG. 4 has contact socket 48 for the alternating current. The rectifier 41 is of another conventional type than the rectifier 31 according to FIG. 3.

FIG. 5 shows a rectifier element 51 mounted directly upon the terminal 52. A contact bush 53 is provided with a flange 54 and is inserted in a bore in the terminal pin 52. The contact bush has a double function, namely to provide the best possible contact between the rectifier element 51 and the terminal 52 and to improve the heat conductivity of the terminal. For that purpose, the bush is made from a material with better heat conductivity than the material of the rest of the terminal. Of course, the device may be without the bush 53 in which case the threaded bolt of the rectifier element may be screwed directly into a threaded bore in the terminal pin. The rectifier may also in this case be surrounded by a protecting casing.

According to the embodiment of FIG. 6, there is a clamping means 65 adapted to be clamped round a pole in 60 of a storage battery by means of a clamping screw 69. The clamping means 65 is preferably made from a material with good heat conductivity, such as cast aluminum.

The clamping means 65 has a projecting stud 70 which is provided with a threaded bore 71 at its end. A rectifier element 61 is provided with a fastening screw which is threaded into said bore 71. 67 is a conductor for supplying the alternating current to the device and 68 is a fuse holder with a fuse. 66 is a transient absorbing capacitor connected between the poles of the rectifier element 61.

The projecting end of the stud 70, the rectifier element 61 and the capacitor 66 are hermetically sealed in a casing 72 of synthetic resin, such as for example a material which is sold under the trade name "Araldine," and which may be moulded round said details at room temperature.

In order to further improve the cooling effect of the devices described in the foregoing, these may in certain cases be provided with cooling flanges or other means with similar function.

Each of the rectifier devices described in the foregoing may be provided with more than one rectifier element. In the devices according to FIGS. 3, 4, 5 or 6, the surfaces of the intermediate connecting members 33, 43, 70 and 54, respectively, may be sufficiently great to receive, for example, three rectifier elements. In operation, one such device could be used at the positive pole of a storage battery. In this device all rectifier elements should have their negative poles connected to the intermediate connecting member. Another device of the kind described should be used at the negative pole of the battery. In this device all rectifier elements should have their positive poles connected to the intermediate connecting member.

The free pole of each rectifier element of one of said devices should be connected by means of a connecting conductor to the free pole of a rectifier element in the other of said devices. Thus, there will be three such connecting conductors in this case and to these three conductors the three phases of a three phase alternating current source may be connected in order to charge the battery from said alternating current source.

In the charging circuits which include any of the devices according to the present invention, there may be resistors connected in series with the rectifier elements in a manner well known per se, in order to avoid current peaks which might damage the rectifier elements, the battery or other parts of the circuit.

What I claim is:
1. In combination: a storage battery having at least one terminal capable of conducting heat to components of said battery from which said heat can dissipate into the surrounding environment; a rectifier including at least one heat sensitive semiconductor device; and means for preventing the overheating of said semiconductor device including means mounting said device in heat conductive relationship to said thermally conductive battery terminal, whereby heat developed in said semiconductor device is conducted from said device and transferred to the components capable of dissipating it into the surrounding environment, thereby minimizing the heating of the semiconductor device.

2. In combination: a storage battery having at least one terminal capable of conducting heat to components of said battery from which said heat can dissipate into the surrounding environment; a rectifier including at least one heat sensitive semiconductor device; and means for preventing the overheating of said semiconductor device including a metallic member providing a heat sink disposed in heat conductive relationship to said semiconductor device, means cooperating with said metallic member to hermetically seal said semiconductor device, and means mounting said device with said heat sink in heat conductive relationship to said thermally conductive battery terminal, whereby heat developed in said conductor device is conducted from said device and transferred to the components capable of dissipating it into the surrounding environment, thereby minimizing the heating of the semiconductor device.

3. The combination of claim 2, wherein the means cooperating with the metallic member providing the heat sink to hermetically seal the semiconductor device is a plastic casing surrounding said device and a portion of the metallic member.

4. In combination: a storage battery having at least one terminal capable of conducting heat to components of said battery from which said heat can dissipate into the surrounding environment; a rectifier including at least one heat sensitive semiconductor device; and means for preventing the overheating of said semiconductor device including a metallic member providing a heat sink in heat conductive relationship to said semiconductor device, there being cooperating threads on said metallic member and said terminal for mounting said member in heat conductive relationship to said thermally conductive battery terminal, whereby heat developed in said semiconductor device is conducted from said device and transferred to the components capable of dissipating it into the surrounding environment, thereby minimizing the heating of the semiconductor device.

5. The combination of claim 4, wherein said battery terminal has a bore in one end thereof and said metallic member has a protrusion on the side thereof opposite the semiconductor device, said cooperating threads being formed on said protrusion and in said bore, respectively, whereby said protrusion is adapted to be threaded into said bore to connect said metallic member in heat conducting relationship to said battery terminal.

6. In combination: a storage battery having at least one terminal capable of conducting heat to components of said battery from which said heat can dissipate into the surrounding environment; a rectifier including at least one heat sensitive semiconductor device; and means for preventing the overheating of said semiconductor device including means disposed in heat conductive relationship to said semiconductor device and adapted to be clamped around said storage battery terminal for connecting said semiconductor device thereto, said connecting means being fabricated of a thermally conductive material, whereby the heat developed in said semiconductor device is conducted from said device through said battery terminal and transferred to the components capable of dissipating it into the surrounding environment, thereby minimizing the heating of the semiconductor device.

7. The combination of claim 6, together with a protective casing cooperating with said connecting means to enclose said semiconductor device and at least one transient-absorbing capacitor operably connected to said semiconductor to protect said semiconductor against transient voltages, said capacitor being housed in said casing with said semiconductor device.

8. The combination of claim 6, wherein the casing enclosing the semiconductor device comprises a body of synthetic resin molded around said device and at least the portion of the connecting means thereadjacent.

9. In combination: a storage battery having at least one heat conductive component capable of conducting heat to components of said battery from which said heat can dissipate into the surrounding environment; a rectifier including at least one heat sensitive semiconductor device; and means for preventing the overheating of said semiconductor device including means mounting said device in heat conductive relationship to said thermally conductive battery component, whereby heat developed in said semiconductor device is conducted from said device and transferred to the components capable of dissipating it into the surrounding environment, thereby minimizing the heating of the semiconductor device, and means operably associated with said thermally conductive device for increasing the rate at which heat is transferred from said semiconductor device to the heat dissipating components of said battery.

10. The combination of claim 9, wherein said thermally conductive battery component has a passage therein and the means for increasing the rate at which heat is transferred from said semiconductor device comprises a body of material having a substantially higher thermal conductivity than the thermally conductive battery component disposed in said passage.

References Cited
UNITED STATES PATENTS

| | | | |
|---|---|---|---|
| 411,370 | 9/1889 | Barrett | 339—116 |
| 1,456,420 | 5/1923 | Blackburn | 339—224 X |
| 2,442,445 | 6/1948 | Toelle | 339—224 X |
| 2,531,162 | 11/1950 | Rutherford | 339—116 |
| 2,766,437 | 10/1956 | Ahlgren | 339—224 |
| 3,225,258 | 12/1965 | Brekoo et al. | 317—99 |
| 3,252,060 | 5/1966 | Marino et al. | 317—234 |

ROBERT K. SCHAEFER, *Primary Examiner.*

M. GINSBURG, *Assistant Examiner.*